United States Patent [19]

Hyakutake

[11] Patent Number: 4,669,349

[45] Date of Patent: Jun. 2, 1987

[54] ELECTRONIC DRUM HAVING A CLOSED AIR SPACE

[75] Inventor: Seiichi Hyakutake, Shizuoka, Japan

[73] Assignee: Nippon Gakki Seizo Kabushiki Kaisha, Hamamatsu, Japan

[21] Appl. No.: 751,747

[22] Filed: Jul. 2, 1985

[30] Foreign Application Priority Data

Jul. 5, 1984 [JP] Japan ............................... 59-137956
Feb. 27, 1985 [JP] Japan ............................ 60-26301[U]

[51] Int. Cl.[4] ................................................ G01H 3/14

[52] U.S. Cl. .............................. 84/1.14; 84/DIG. 12; 84/DIG. 24

[58] Field of Search ....................... 84/1.04, 1.06, 1.14, 84/DIG. 12, DIG. 24

[56] References Cited

U.S. PATENT DOCUMENTS 4,226,156 10/1980 Hyakutake .......................... 84/1.14
4,479,412 10/1984 Klynas ................................ 84/1.04

*Primary Examiner*—S. J. Witkowski

*Attorney, Agent, or Firm*—Blakely, Sokoloff, Taylor & Zafman

[57] ABSTRACT

An electronic drum has a drum body, a drumhead, a support/tension mechanism, a closed space forming member, a vibrating plate, and a piezoelectric element. The closed space forming member forms a closed air space together with the drumhead lower surface. The vibrating plate is fitted to the closed space forming member so as to divide the closed air space into plural closed air spaces. One of the divided plural closed air spaces existing between the lower surface of the drumhead and the vibrating plate serves as a transmission space. When the drumhead is struck, the vibration of the struck drumhead is transmitted to the vibrating plate via the transmission space. By this transmission via air space, same vibration at the vibrating plate is obtained irrespective of the struck portion of the drumhead if struck by same striking force. The piezoelectric element converts a pressure produced based on a mechanical vibration of the vibrating plate to an electrical signal.

20 Claims, 6 Drawing Figures

ELECTRONIC DRUM HAVING A CLOSED AIR SPACE

BACKGROUND OF THE INVENTION

The present invention relates to an electronic drum in which the deviation among electric signals which correspond to detected percussions of substantially equal striking force but occurring at different locations on the drum is changed in accordance with a change in striking force, and in which the stick feeling is similar to that in an acoustic drum.

In á conventional electronic drum, a player strikes a drumhead with drumsticks, and vibrations generated by this striking are converted to electrical signals. A PCM (Pulse Coded Modulation) sound source memorizing a real sound waveshape of·the drum or such a rhythm sound source as constructed by, for example, an FM (Frequency Modulation) sound source is drived in accordance with striking information representing striking time, volume and so on. Thereby, an electronic drum sound is sounded from at a loudspeaker. The following demands have arisen for an electronic drum: (1) uniform outputs (sensitivity) of a pickup irrespective of striking positions if struck by same striking force; (2) changes in magnitude of output signals in accordance with the different magnitudes of striking force for a player's musical expression; and (3) drumstick feeling similar to that of an acoustic drum.

However, in a conventional electronic drum, a piezoelectric element is directly mounted on or under a wood or plastic plate corresponding to a drumhead to convert a mechanical vibration of the plate to an electrical signal, so that the above demand (1) can be satisfied. However, since the wood or plastic plate which a player must strike is a hard, drumstick feeling greatly differs from that of an acoustic drum. In order to improve drumstick feeling, rubber or the like is adhered to the upper surface of the hard board, but sensitivity is degraded, resulting in inconvenience.

Another conventional electronic drum is also known, as shown in FIG. 1. A drumhead 1 is set on a body 2. A cushion member 4 is disposed between the drumhead 1 and an intermediate board 3. A dynamic loudspeaker 5 is mounted as a microphone on the lower surface of the intermediate board 3. In such an electronic drum, stick feeling can be similar to that of an acoustic drum. However, light stick work cannot be accurately picked up. In addition, since the loudspeaker 5 has a large thickness, a total thickness of the drum is increased, resulting in inconvenience.

SUMMARY OF THE INVENTION

It is, therefore, a principal object of the present invention to provide an electric drum wherein deviation among electric signals corresponding to detected percussions of substantially equal striking force occurring at different locations on the drum head is reduced.

It is another object of the present invention to provide an electronic drum wherein magnitude of output signals can be obtained in accordance with different magnitudes of striking force for a player's musical expression.

It is still another object of the present invention to provide an electronic drum wherein drumstick feeling is similar to that of an acoustic drum.

In order to achieve the above objects of the present invention, there is provided an electronic drum comprising:

a drum body;

a drumhead;

support/tension means fitted to the drum body for supporting and stretching the drumhead;

a closed space forming member disposed below a lower surface of the drumhead for forming a closed air space together with the drumhead lower surface;

a vibrating plate means, fitted to the closed space forming member so as to divide the closed air space into plural closed air spaces, for vibrating in response to vibration of the struck drumhead;

transmission space which is one of the divided plural closed air spaces existing between the lower surface of the drumhead and the vibrating plate means and the vibration of the struck drumhead being transmitted to the vibrating plate means via the transmission space; and a piezoelectric element mounted on the vibrating plate means for converting a pressure produced based on a mechanical vibration of the vibrating plate means to an electrical signal.

DESCRIPTION OF THE PREFERRED EMBODIMENTS

Figure 1:
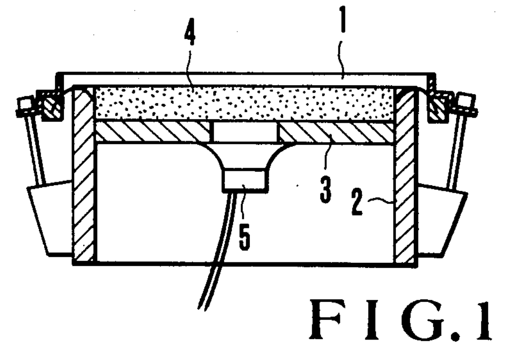
FIG. 1 PRIOR ART
FIG. 1 is a sectional view showing a conventional electronic drum.
Figure 2:
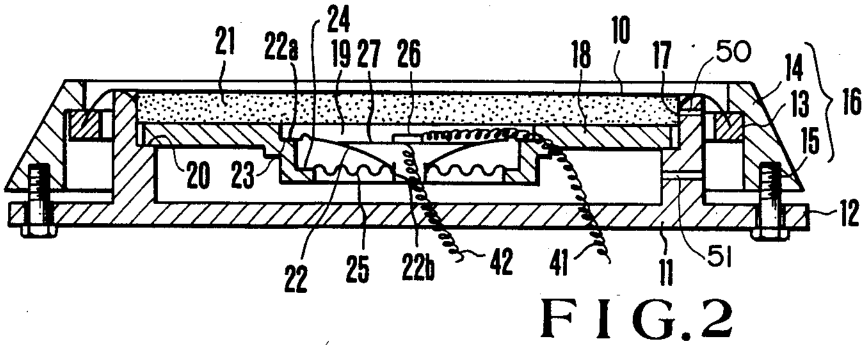
FIG. 2 is a sectional view showing an electronic drum according to a first embodiment of the present invention.

FIG. 2 is a sectional view showing an electronic drum according to a first embodiment of the present invention. Referring to FIG. 2, a drum body 11 has an integral collar 12 having a cylindrical shape with a bottom. A drumhead 10 is set in an opening of the body 11 by a known support/tension means 16 consisting of a head frame 13, a tension frame 14 and tuning bolts 15. A closed space forming member 18 is disposed inside the body 11 to form a closed space 17 together with the drumhead 10. The member 18 has a central hole 19. The peripheral portion of the member 18 is supported by a step 20 formed on the inner wall at the intermediate level along the direction of thickness of the body 11. A flexible material 21, i.e., a foamed material such as sponge is fitted in the closed space 17 and is brought into contact with or slightly separated from the lower surface of the drumhead 10. A curved cone (or cone) vibrating plate 22 is fitted in the central hole 19 such that an edge **22*a* of the vibrating plate 22 is fixed to a first step 23 provided on an inner wall of the member 18. A neck 22*b* of the vibrating plate 22 is supported by a damper 25 whose edge is fixed to a second step 24. A thin metal vibrating plate 27 is fitted to an upper portion of the cone vibrating plate 22. A piezoelectric element 26 is fixed on the metal vibrating plate 27 to serve as a pickup device for converting a mechanical vibration of the vibrating plate 22 to an electrical signal. The piezoelectric element 26 and the vibrating plates 22 and 27 are not in contact with the flexible material 21** but via an air space therebetween.

The closed air space formed by the closed air space forming member 18 need not be a perfectly closed air space. For example, a small air duct hole 50 may be formed in a side surface of the body 11 (i.e., the hole 50 radially extends at the substantially same height as that of the flexible member 21 outside the periphery thereof). The vibration of the drumhead can then be transmitted to the vibrating plates 22 and 27 with higher sensitivity. An air duct hole 51 may be radially formed in the side surface of the lower portion of the body for the same reason as described above. The closed air space in this specification is not limited to the perfectly closed air space but can include a substantially closed air space with an air duct hole.

According to the electronic drum having the construction described above, when a player strikes the drumhead 10, the vibrations of the drumhead 10 are transmitted to the cone vibrating plate 22 via air sealed in the closed space 17. As a result, the cone vibrating plate 22 vibrates, whereby the metal vibrating plate 27 also vibrates. Therefore, the metal vibrating plate 27 makes substantially same vibration irrespective of the striking position of the drumhead 10 if struck by the same striking force. The piezoelectric element 26 detects a pressure produced on the metal vibrating plate 27 based on its vibration and converts the detected pressure to a corresponding electrical voltage signal. The voltage signal is delivered out of the body 11 through lines 40 and 41 and then utilized to drive an electronic tone source. As the metal vibrating plate 27 is used as one electrode of the piezoelectric element 26, the line 40 is lead out of the metal vibrating plate 27 itself. The flexible material 21 provides a sound insulating effect and an antivibration effect for preventing vibrations reflected by the member 18 from being transmitted to the drumhead 10, thereby decreasing the striking sound. When the flexible material comprises sponge which has sufficient flexibility, stick control feeling is substantially the same as that of an acoustic drum.

Since the piezoelectric element 26 is compact and lightweight, it does not adversely influence the vibration characteristics of the vibrating plates 22 and 27. In addition, the piezoelectric element 26 has good high-frequency characteristics and can accurately respond to stick control. Therefore, the element 26 can accurately respond to vibrations of the drumhead 10. The damper 25 is useful in damping the vibration of the vibrating plate 22, so that the vibrating plates 22 and 27 can be returned rapidly to an initial state before next stick striking.

Figure 3:
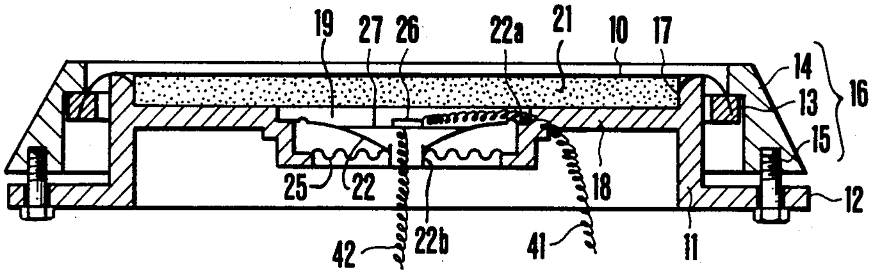
FIG. 3 is a sectional view showing an electronic drum according to a second embodiment of the present invention.

FIG. 3 is a sectional view showing an electronic drum according to a second embodiment of the present invention. In this embodiment, the structure of the electronic drum is substantially the same as that of the first embodiment, except that a drum body 11 is integrally formed with a closed space forming member 18 and the lower surface of the body is open.

Figure 4:
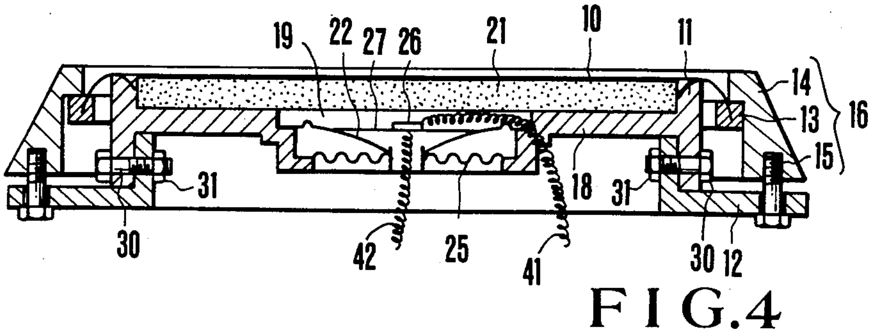
FIG. 4 is a sectional view showing an electronic drum according to a third embodiment of the present invention.

FIG. 4 is a sectional view showing an electronic drum according to a third embodiment of the present invention. The electronic drum of the third embodiment is substantially the same as that of the first or second embodiment, except that a drum body 11 is formed integrally with a closed space forming member 18, and a collar 12 for the body 11 is separately formed by another member which is fitted with the lower end opening of the body 11 and is fixed to the collar 12 by bolts 30 and nuts 31, thereby reinforcing the body 11.

The same effect as in the first embodiment can be obtained in the second and third embodiments.

According to the first to third embodiments of the present invention, the closed space is formed below the lower surface of the drumhead, and the flexible material having cells is inserted in the closed space. Stick control feeling is substantially the same as that in an acoustic drum, and sensitivity variations of a piezoelectric element in accordance with the different striking positions can be eliminated. Furthermore, the flexible material provides a sound insulating effect and antivibration effect, so that the striking sound can be reduced. Since the piezoelectric element having good high-frequency characteristics is mounted on a metal vibrating plate fitted to the cone vibrating plate which has its neck supported by the damper, good response to stick control can be obtained, and vibrations of the drumhead can be accurately detected. The piezoelectric element is compact and lightweight, so that no adverse effect is imposed on the vibration characteristics of the vibrating plate. The total thickness of the drum can be decreased.

Figure 5:
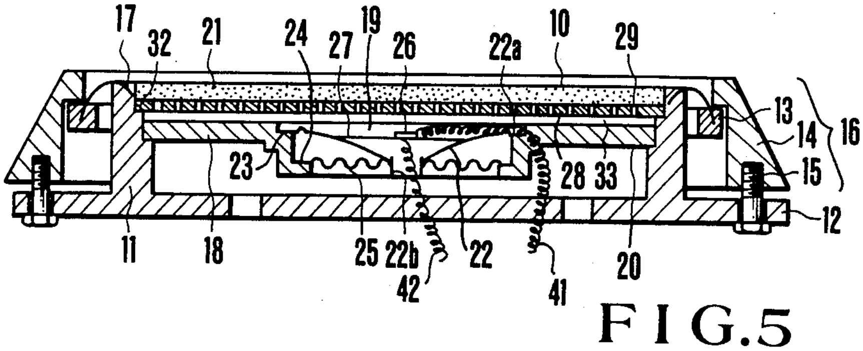
FIG. 5 is a sectional view showing an electronic drum according to a fourth embodiment of the present invention.

FIG. 5 is a sectional view showing an electronic drum according to a fourth embodiment of the present invention. The same reference numerals in the fourth embodiment denote the same parts as in the first embodiment, and a detailed description thereof will be omitted. Only differences between the fourth embodiment and the first embodiment will be described hereinafter. More particularly, the arrangement of a closed space 17 in the fourth embodiment is the main difference from the first embodiment.

A flexible material 21 such as a sponge having a plurality of small interconnecting holes (i.e. open cell structure), a plurality of small holes which are isolated from one another (i.e. closed cell structure), or a combination thereof and a porous plate 28 for supporting the lower surface of the flexible material 21 are housed in the closed space 17. The flexible material 21 is in contact with or slightly separated from the lower surface of a drumhead 10. The porous plate 28 has a large number of uniform pores 29 throughout the entire surface. The porous plate 28 is supported by a step 32 formed above a step 20 at the edge of a drum body 11. The porous plate 28 defines an air layer 33 in the closed space together with a closed space forming member 18.

A piezoelectric element 26 fitted on the metal vibrating plate 27 is not in direct contact with the porous plate 28 but via an air space.

According to the electronic drum described above, the flexible material 21 can be uniformly supported by the porous plate 28 and the air layer 33. The porous plate 28 has a large number of pores 29 which are substantially uniformly distributed through the entire surface. Since the vibration of the drumhead 10 is transmitted to a cone vibrating plate 22 via air closed in the closed space 17 and air in the air layer 33, vibrations of the cone vibrating plate 22 is same irrespective of striking positions of the drumhead 10 if struck by same striking force. Therefore, sensitivity variations of different striking positions on the drumhead 10 can be eliminated.

The flexible material 21 and the piezoelectric element 26 are in the same manner as described in the first to third embodiments.

Figure 6:
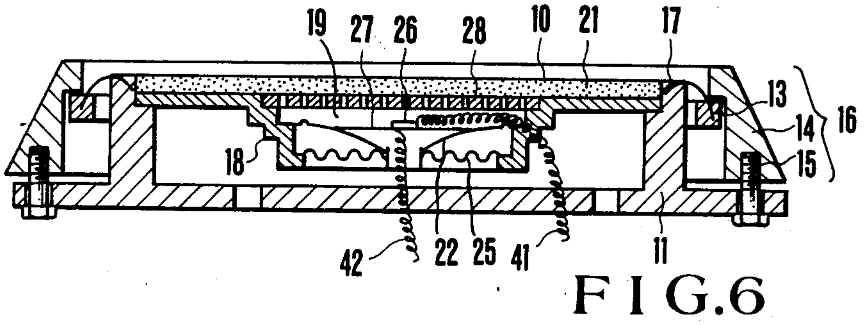
FIG. 6 is a sectional view showing an electronic drum according to a fifth embodiment of the present invention.

FIG. 6 is a sectional view showing an electronic drum according to a fifth embodiment of the present invention. The same reference numerals in the fifth embodiment denote the same parts as in the fourth embodiment, and a detailed description thereof will be omitted. In the fifth embodiment, a porous plate 28 is fitted in an upper opening as a central hole 19 of a closed space forming member 18. A flexible material 21 is supported by the surfaces of the member 18 and the porous plate 28.

In this case, since the member 18 has the same level as the porous plate 28, the fifth embodiment differs from the fourth embodiment in that the air layer is not formed below the peripheral portion of the flexible material. However, when the flexible material 21 used in an experiment had a closed-cell structure, it was found that the same effect as in the fourth embodiment could be obtained.

In the electronic drum according to each of the fourth and fifth embodiments of the present invention, the closed space forming member is located below the drumhead to form a closed space therebetween. The flexible material having cells and the porous plate for supporting the lower surface of the flexible material are mounted in the closed space. The neck of the vibrating plate is supported by the closed space forming member. Vibrations of a metal vibrating plate fitted to the cone vibrating plate are converted by the piezoelectric element to a corresponding electrical signal. The stick control feeling is similar to that of an acoustic drum. The flexible material is substantially uniformly supported to eliminate sensitivity variations based on different striking positions of the drumhead 10. The flexible material has the sound insulating effect and the antivibration effect, so that the striking sound can be decreased. Since the piezoelectric element is compact and lightweight, no adverse effect is imposed on the vibration characteristics of the vibrating plate. The piezoelectric element also has good high-frequency characteristics, and vibrations of the drumhead can be accurately detected, thus providing great practical effects.

The air duct hole as in the first embodiment is not formed in the electronic drums of the second to fifth embodiments. However, the air duct holes may be provided in the second to fifth embodiments in the same manner as in the first embodiment.

Further, in the above first to fifth embodiments, the flexible material 21 comprises sponge, but is not limited to this. The flexible material may have a plurality of interconnecting holes (i.e. an open cell structure), a plurality of holes which are isolated from one another (i.e. a closed cell structure) or a combination thereof.

What is claimed is:

1. An electronic drum comprising:
- a drum body;
- a drumhead;
- support/tension means fitted to said drum body for supporting and stretching said drumhead;
- a closed space forming member disposed below a lower surface of said drumhead for forming a closed air space together with the drumhead lower surface;
- a vibrating plate means, fitted to said closed space forming member so as to divide said closed air space into plural closed air spaces, for vibrating in response to vibration of the struck drumhead;
- transmission space which is one of said divided plural closed air spaces existing between said lower surface of said drumhead and said vibrating plate means and said vibration of said struck drumhead being transmitted to said vibrating plate means via said transmission space; and
- a piezoelectric element mounted on said vibrating plate means for converting a pressure produced based on a mechanical vibration of said vibrating plate means to an electrical signal.

2. A drum according to claim 1, wherein said vibrating plate means comprises:
- (i) first vibrating plate fitted to said closed space forming member, and
- (ii) second vibrating plate fitted to said first vibrating plate, said piezoelectric element being mounted on said second vibrating plate.

3. A drum according to claim 2, wherein said drum further comprises:
- damping means, whose one end is fitted to said first vibrating plate and whose another end is fitted to said closed space forming member, for damping vibration of said first vibrating plate.

4. A drum according to claim 1, wherein said drum further comprises:
- flexible material means inserted into said closed space whose upper surface is contact with or slightly separated from said drumhead lower surface.

5. A drum according to claim 2, wherein said second vibrating plate comprises a thin metal which functions as one electrode of said piezoelectric element.

6. A drum according to claim 2, wherein said first vibrating plate being in the form of cone, and said second vibrating plate being a thin circle plate.

7. A drum according to claim 1, wherein said drum body has a bottom.

8. A drum according to claim 1, wherein said closed space forming member is formed separately from said drum body.

9. A drum according to claim 1, wherein said closed space forming member is integrally formed with said drum body.

10. A drum according to claim 9, wherein said drum body is integrally formed with a collar.

11. A drum according to claim 9, wherein said drum body is formed separately from a collar which is fitted to said drum body and which is fastened by bolts and nuts to said drum body.

12. A drum according to claim 4, wherein said flexible material means is in contact with said closed space forming member.

13. A drum according to claim 4 wherein said flexible material comprises a foamed material of an open-cell structure.

14. A drum according to claim 4, further comprising a porous plate having a large number of pores for supporting said flexible material means, said pores being substantially uniformly distributed throughout an entire surface thereof.

15. A drum according to claim 14, wherein said closed air space includes said pores.

16. A drum according to claim 14, wherein said porous plate is fitted to said closed space forming member.

17. A drum according to claim 1, wherein said drum body has a cylindrical shape.

18. A drum according to claim 4 wherein said flexible material comprises foamed material of a closed cell structure.

19. A drum according to claim 4 wherein said flexible material comprises a foamed material having a first portion and a second portion, said first portion having an open-cell structure, said second portion having a closed-cell structure.

20. An electronic drum comprising:

a drum body;

a drum head;

support/tension means fitted to said drum body for supporting and stretching said drum head;

a closed air space forming member disposed below a lower surface of said drum head for forming a substantially closed air space together with the drum head lower surface;

a vibrating plate means, fitted to said closed air space forming member and being disposed within said substantially closed air space so as to divide said substantially closed air space into a plurality of substantially closed air spaces, for vibrating in respect to vibration of the struck drum head;

transmission space which is one of said divided plural substantially closed air spaces existing between said lower surface of said drum head being transmitted to said vibrating plate means via said transmission space; and a piezoelectric element mounted on said vibrating plate means for converting a pressure produced based on a mechanical vibration of said vibrating plate means to an electrical signal.

* * * * *